J. A. McGRATH.
VEHICLE BRAKE.
APPLICATION FILED OCT. 29, 1910.

996,871.

Patented July 4, 1911.

WITNESSES:
L. L. Mead
W. A. Alexander.

INVENTOR
John A. McGrath
BY
Fowler, Huffman
ATTORNEYS

COLUMBIA PLANOGRAPH CO., WASHINGTON, D. C.

UNITED STATES PATENT OFFICE.

JOHN A. McGRATH, OF ST. LOUIS, MISSOURI.

VEHICLE-BRAKE.

996,871.  Specification of Letters Patent.  Patented July 4, 1911.

Original application filed July 20, 1910, Serial No. 572,798. Divided and this application filed October 29, 1910. Serial No. 589,679.

*To all whom it may concern:*

Be it known that I, JOHN A. McGRATH, a citizen of the United States, residing at the city of St. Louis, Missouri, have invented a certain new and useful Vehicle-Brake, of which the following is such a full, clear, and exact description as will enable any one skilled in the art to which it appertains to make and use the same, reference being had to the accompanying drawings, forming part of this specification.

This application is a division of my prior application Serial No. 572,798, filed July 20, 1910.

My invention relates to vehicle brakes and is particularly adapted for use in connection with heavy and fast moving vehicles, such for instance, as railway cars and large motor cars.

The object of my invention is to provide a brake which can be operated very rapidly and which at the same time will be strong and reliable in action and not likely to get out of order.

Figure 1:
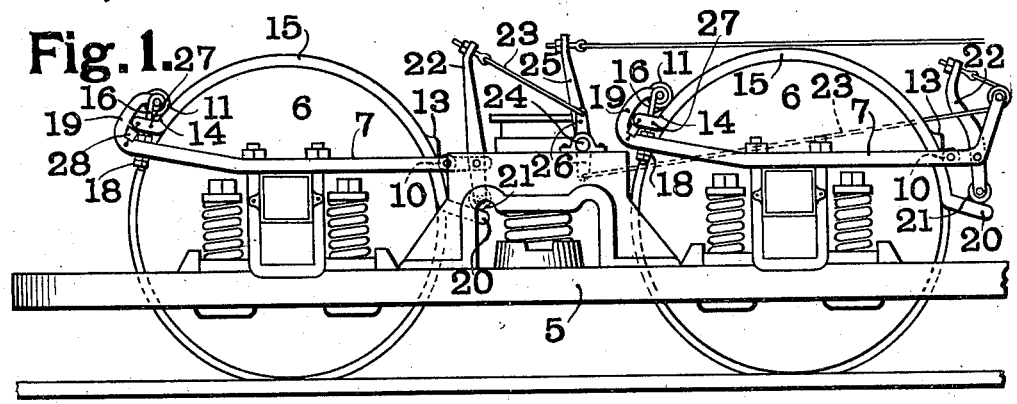
Figure 2:
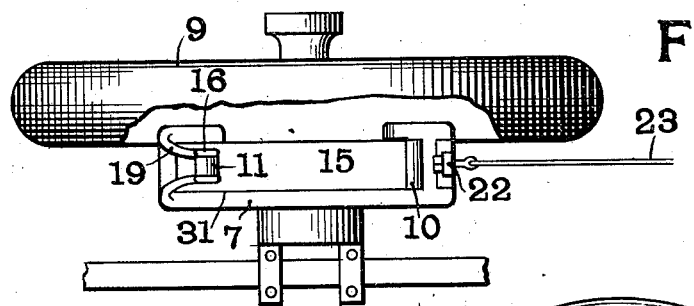
Figure 3:
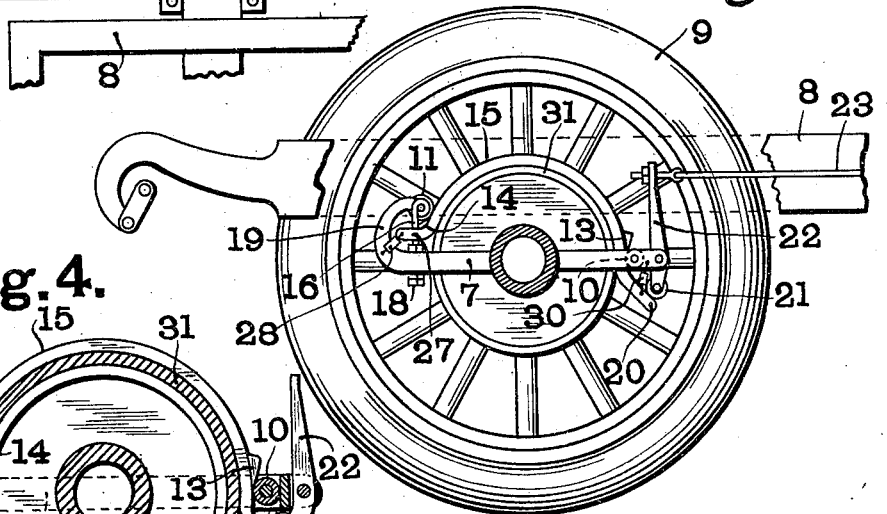
Figure 4:
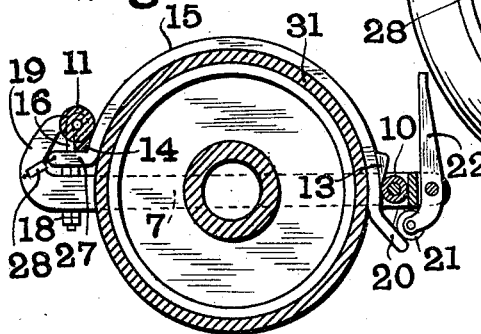

In the accompanying drawings which illustrate one form of brake made in accordance with my invention, Figure 1 is a side elevation of a portion of a railway car with my brake applied thereto; Fig. 2 is a top plan view of a portion of a motor car with my brake applied thereto; Fig. 3 is a side elevation of the parts shown in Fig. 2; and Fig. 4 is an enlarged sectional view of some of the parts shown in Figs. 2 and 3.

Like marks of reference refer to similar parts in the several views of the drawings.

5 represents the truck of a railway car carrying the wheel 6. Adjacent to each of the wheels 6 is mounted a support 7. In Figs. 2, 3 and 4 the brake is shown applied to a motor vehicle a portion of the frame 8 of which is shown. This frame 8 carries the wheels 9 adjacent to which the support 7 is mounted, as best shown in Fig. 3. The support 7 has secured to it near one end an anti-friction roller 10 and near the other, an anti-friction roller 11. These rollers 10 and 11 are adapted to coöperate with wedge-shaped projections 13 and 14 respectively carried by a brake shoe 15. The rear roller 11 is carried by means of bolts 16 secured in the support 7 by nuts 18. In order to prevent the bolts 16 from being bent away from the shoe by the pressure of the wedges 14, I provide the support 7 with a brace 19 preferably formed integral therewith, which brace bears upon the bolts 16 as best shown in Fig. 1. In order to operate the shoe 15 to draw the wedge-shaped projections 13 and 14 under the rollers 10 and 11 I provide the forward end of the said shoe with an inclined projection 20 adapted to be acted on by roller 21 carried in the end of a lever 22 mounted in the fork-shaped end of the support 7, as best shown in Fig. 4. The lever 22 is operated by means of a rod 23 leading to any suitable actuating mechanism. In the construction shown in Fig. 1 this actuating mechanism consists of a rock shaft 24 operated by a lever 25 and provided with a pair of arms 26, one of which is connected to each of the rods or cords 23. In order to withdraw the shoes 15 after they have been applied, I provide the rear end of each of said shoes with a projection 27 to which is attached one end of the coil spring 28, the opposite end of which is attached to the support 7. A spring 30 may also be provided at the front end of the shoe, as shown in Fig. 3. In the form shown in Figs. 2, 3 and 4, the shoe 15 does not act directly upon the wheel but instead operates upon a wheel 31 mounted upon the side of the wheel 9.

The operation of my brake is as follows: When the lever 22 is operated the roller 21 carried thereby coöperates with the inclined forward end 20 of the brake shoe 15 and moves the brake shoe bodily around the wheel 6, or around the wheel 31, so as to draw the wedge-shaped projections 13 and 14 under the rollers 10 and 11 and thus force the shoe against the wheel. As the brake shoe is forced toward the wheel at both ends the entire wearing surface of the shoe is brought into contact with the wheel and thus the brake is applied in the most effective manner. Owing to the construction a very slight movement only is necessary to throw the shoe firmly into contact with the wheel and consequently my brake is very rapid in its operation. It will also be seen that a very heavy shoe can be used and that consequently the brake will not readily wear out or get out of order.

Having fully described my invention, what I claim as new and desire to secure by Letters Patent of the United States is:

1. In a vehicle brake, the combination with a vehicle body and wheels, of a support adjacent to the wheels, a brake shoe, a pair of rollers carried by one of said latter named parts and a pair of inclined bearings carried by the other of said parts and coöperating with said rollers, and means for moving said brake shoe bodily around the wheel to cause said rollers and bearings to coöperate to apply the shoe.

2. In a vehicle brake, the combination with the vehicle body and wheels, of a support adjacent to the wheel, a pair of rollers carried by said support, a brake shoe provided with a pair of wedge-shaped projections, and means for moving said brake shoe bodily around the wheel to draw said projections beneath said rollers.

3. In a vehicle brake, the combination with a vehicle body and wheels, of a support adjacent to said wheel, a pair of abutments carried by said support, a brake shoe provided with a pair of wedge-shaped projections on its rear face, said projections being adapted to be drawn beneath said abutments to apply the brake, an inclined projection carried by one end of said brake shoe, and a lever coöperating with said inclined projection to move said shoe bodily around the wheel.

4. In a vehicle brake, the combination with the vehicle body and wheels, of a support adjacent to said wheel, a pair of rollers carried by said support one on each side of the wheel, a brake shoe provided at its rear face with a pair of wedge-shaped projections adapted to be carried on one end of said shoe, a lever pivoted to said support and provided at its end with an anti-friction roller coöperating with said inclined projection to move the shoe bodily around the wheel, and means for operating said lever.

5. In a vehicle brake, the combination with the vehicle body and wheels, of a support adjacent to one of the wheels, said support being provided with a pair of abutments, and a forked end, a lever pivoted in the forked end of said support, and a brake shoe operated by said lever, said brake shoe having wedges adapted to be drawn under said abutments.

6. In a vehicle brake, the combination with the vehicle body and wheels, of a support adjacent to one of said wheels, said support being provided with a pair of rollers and a forked end, a lever pivoted in the forked end of said support, and a brake shoe operated by said lever, said brake shoe having wedges adapted to be drawn under said rollers.

7. In a vehicle brake, the combination with the vehicle body and wheels, of a support adjacent to one of said wheels, said support being provided at its forward end with an abutment, a roller carried at the rear end of said support, a brace for said roller carried by said support, a brake shoe provided with wedge-shaped projections adapted to be drawn under said abutment and roller, and a lever pivoted to said support for operating said shoe.

In testimony whereof, I have hereunto set my hand and affixed my seal in the presence of the two subscribing witnesses.

JOHN A. McGRATH. [L. S.]

Witnesses:
W. A. ALEXANDER,
ELIZABETH BAILEY.

---

Copies of this patent may be obtained for five cents each, by addressing the "Commissioner of Patents, Washington, D. C."